United States Patent [19]

Gorin

[11] 4,145,405

[45] * Mar. 20, 1979

[54] PRODUCTION OF A HYDROGEN-RICH GAS FROM A CO-CONTAINING FUEL GAS

[75] Inventor: Everett Gorin, Pittsburgh, Pa.

[73] Assignee: Continental Oil Company, Ponca City, Okla.

[*] Notice: The portion of the term of this patent subsequent to Jan. 10, 1995, has been disclaimed.

[21] Appl. No.: 826,803

[22] Filed: Aug. 22, 1977

Related U.S. Application Data

[63] Continuation of Ser. No. 665,596, Mar. 10, 1976, Pat. No. 4,067,958.

[51] Int. Cl.² .................... C01B 1/02; C01B 1/13
[52] U.S. Cl. .................... 423/657; 423/648 R; 252/439
[58] Field of Search .................... 423/648 R, 657; 252/373, 439, 447, 467

[56] References Cited

U.S. PATENT DOCUMENTS

| 820,374 | 5/1906 | Weise et al. | 260/542 |
|---|---|---|---|
| 1,274,169 | 7/1918 | Lackman | 260/542 |
| 1,995,211 | 3/1935 | Leroux | 260/542 |
| 3,995,012 | 11/1976 | Barnert et al. | 423/657 |
| 4,067,958 | 1/1978 | Gorin | 423/657 |

OTHER PUBLICATIONS

Boyen et al. "Erdol und Kohle" 6 (1953) pp. 195–199.
Weisser et al. "Sulphide Catalysts, Their Properties and Applications" 1974, pp. 79, 80, 91–104, and 370–373.
Suzuki et al. "Chemical Abstracts" vol. 80, 1974, 95278k.

*Primary Examiner*—Edward J. Meros
*Attorney, Agent, or Firm*—D. Leigh Fowler, Jr.; F. Lindsey Scott; William A. Mikesell, Jr.

[57] ABSTRACT

In a process for the production of hydrogen-rich gas from a fuel gas containing carbon monoxide and other components, the fuel gas is contacted in a formate synthesis zone with an aqueous solution containing sodium or potassium carbonate and/or bicarbonate under conditions effective to produce an effluent aqueous solution of the corresponding formate and an effluent gas containing the other components of the fuel gas. The aqueous formate solution is thereafter subjected to catalytic decomposition in a formate decomposition zone under conditions effective to produce a hydrogen-righ gas and an aqueous solution which consists essentially of carbonate and/or bicarbonate solution.

6 Claims, 1 Drawing Figure

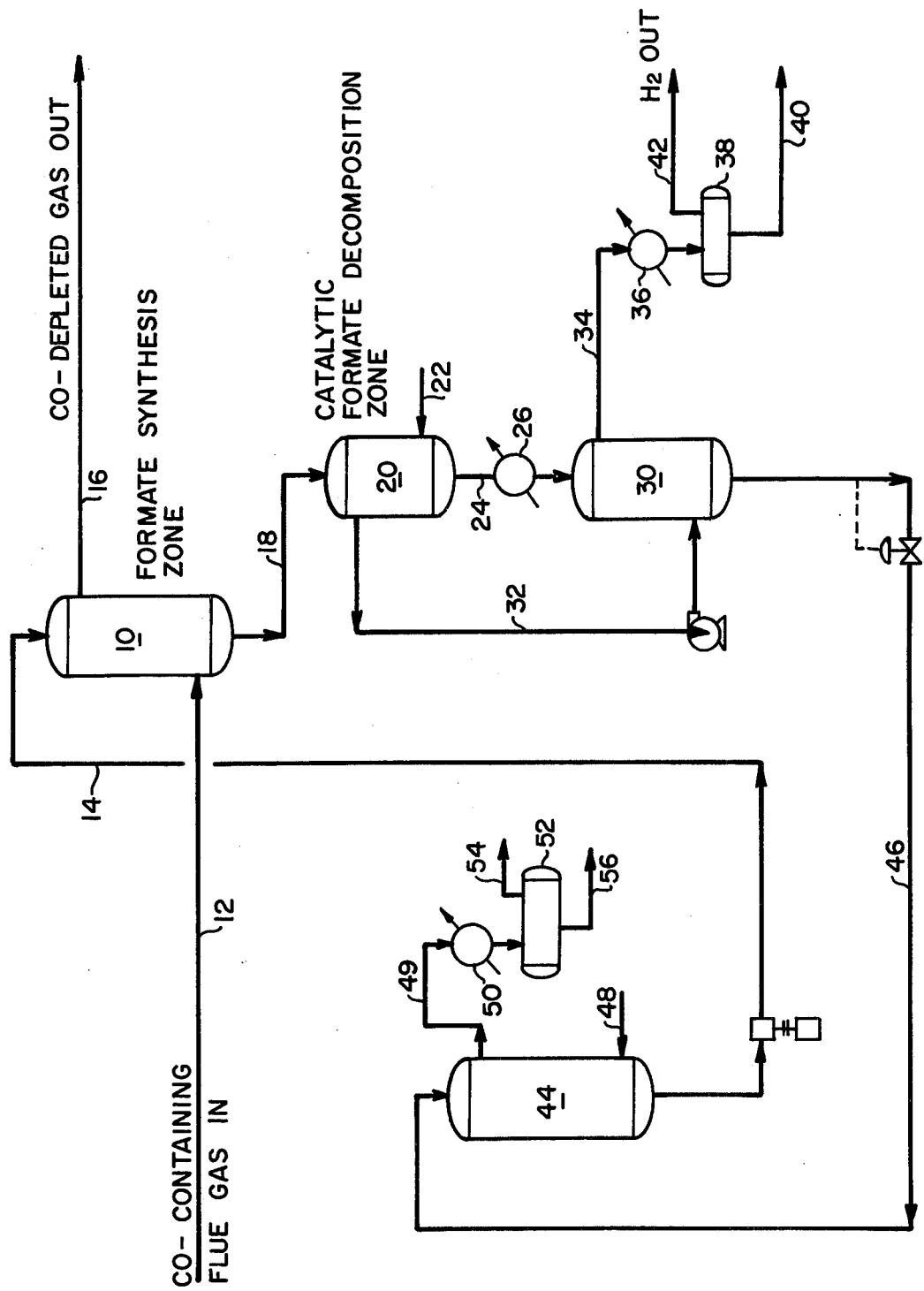

PRODUCTION OF A HYDROGEN-RICH GAS FROM A CO-CONTAINING FUEL GAS

This is a continuation of application Ser. No. 665,596 filed Mar. 10, 1976, now U.S. Pat. No. 4,067,958.

BACKGROUND OF THE INVENTION

This invention relates to a process for the production of hydrogen. More particularly, this invention relates to a process for the production of a hydrogen-rich gas from a fuel gas containing carbon monoxide and other components normally found in the product of gasification of carbonaceous materials.

The most pertinent prior art which was considered in the preparation of this patent application is listed below:

(1) U.S. Pat. No. 1,995,211 issued 3/19/35 to A. Leroux.
(2) U.S. Pat. No. 3,592,850 issued 7/13/71 to N. Mazzocco.
(3) British Pat. No. 173,097.
(4) Advances in Catalysis, Vol. 14 (1963) p. 35 et seq. entitled "The Catalytic Decomposition of Formic Acid."
(5) Chem. Abstracts, Vol. 72, 1970, No. 8818e.
(6) Chem. Abstracts, Vol. 78, 1973, No. 7136k.
(7) Chem. Abstracts, Vol. 78, 1973, No. 110482b.
(8) Chem. Abstracts, Vol. 80, 1974, No. 95278k.
(9) Erdol u Kohle 6:195 (1953) — P. Royer and F. Ehrhard
(10) Erdol u Kohle 9:19 (1956) — P. Royer and F. Ehrhard
(11) Journal of the Chemical Society of Japan 44(5):385
(12) Journal of the Chemical Society of Japan 46(6):554
(13) Journal of the Chemical Society of Japan 46(7):667
(14) Journal of the Chemical Society of Japan 47(1):5

SUMMARY OF THE INVENTION

In accordance with the present invention in its broadest aspects, a process is provided for the production of a hydrogen-rich gas from those fuel gases which contain carbon monoxide and either nitrogen or methane or both. The terms "fuel gas" or "fuel gases" as used herein mean any fuel gas or fuel gases which contain carbon monoxide and either nitrogen or methane, or both. Other components, for example $H_2$ and $CO_2$, which are normally found in fuel gases may be present.

The process comprises two separate essential steps, namely, a formate synthesis step and a catalytic formate decomposition step. In the formate synthesis step, the fuel gas is contacted with an aqueous solution which contains bicarbonate and/or carbonate. For convenience, the term "carbonate" shall hereinafter, including the claims, mean either carbonate or bicarbonate, or both, unless otherwise expressly stated. The carbonate may be either sodium or potassium carbonate. The conditions effective to produce formate are as follows:

Temperature — 400°–600° F.
Pressure — 20–150 atm.

Carbon monoxide is selectively absorbed from the fuel gas by the aqueous solution; and reacts with the bicarbonate and carbonate to produce formate in the solution in accordance with the following reactions:

$$CO + MHCO_3 = MOOCH + CO_2 \quad (1)$$

$$2CO + M_2CO_3 + H_2O = 2MCOCH + CO_2 \quad (2)$$

where M is either Na or K.

In the formate decomposition step of the process, the formate-containing aqueous solution which is produced in the first step is contacted with a catalyst at conditions selected to effect decomposition of formate in accordance with the following reaction:

$$MOOCH + H_2O = MHCO_3 + H_2 \quad (3)$$

These conditions are a temperature in the range of 400° to 600° F. and a total pressure in the range of 30 to 200 atm. Under these conditions, the formate decomposes to produce a hydrogen-rich gas with little or no carbon monoxide and an aqueous solution which contains principally bicarbonate with little or no oxalate. The aqueous solution containing principally $MHCO_3$, together with some $M_2CO_3$, is recycled to the formate synthesis step to absorb more carbon monoxide from the fuel gas.

The catalyst used in the catalytic formate decomposition step should be resistant to aqueous alkali metal solutions. Catalyst composites suitable for such use are metals selected from the group consisting of the transition metals of Groups VI and VIII of the Periodic Table, their oxides or sulfides supported on an alkali resistant base. Examples of the metals are tungsten, chromium, molybdenum, cobalt, iron, nickel, rhodium, platinum, etc. Generally, the sulfides of such metals are preferred. The oxide forms of the metals are sulfided rather than the free metal. Any of the well-known alkali-resistant carriers may be employed as such carriers, as activated carbon, thoria, magnesia, or pumice.

In the preferred embodiment, the fuel gas used as a feedstock is producer gas which is manufactured from a solid carbonaceous fuel, e.g. coal, coke or char. The producer gas is manufactured in a conventional gas producer. The producer gas is contacted in a formate synthesis zone with an aqueous solution containing principally potassium bicarbonate along with some potassium carbonate. The formate synthesis is conducted without a catalyst and at a temperature in the range of 425°–475° F. and a pressure in the range of 50 to 100 atm. Under these conditions, carbon monoxide is absorbed along with a small amount of $H_2S$ by the carbonate in the aqueous solution to produce an aqueous solution which contains principally potassium formate with a small amount of potassium sulfide.

The formate-containing solution of reduced sulfur content is then transferred to a formate decomposition zone where it is subjected to catalytic decomposition in a liquid phase. The catalytic decomposition occurs by contacting the formate-containing solution with steam in the presence of a catalyst composite comprising a Group VI sulfide, most preferably $MoS_2$, supported on active carbon. The conditions best suited for the catalytic decomposition of formate are a temperature in the range of 450°–525° F. and a pressure in the range of 50 to 125 atm. At these conditions, the catalytic decomposition of formate results in the production of a gas which is a hydrogen-rich gas and an aqueous solution which contains principally potassium bicarbonate with some carbonate. This aqueous solution is recycled to the formate synthesis step to absorb more carbon monoxide from the producer gas.

The principal advantage of the preferred embodiment of this invention is that it can produce a hydrogen-rich gas from a low Btu fuel gas such as producer gas. When producer gas is used, the nitrogen content of the producer gas does not interfere with the production of the hydrogen-rich gas. The nitrogen is not absorbed in the formate synthesis step and is rejected from this step along with other components of the fuel gas that are not absorbed, e.g. methane.

DESCRIPTION OF THE DRAWING

The drawing is a schematic flowsheet of a preferred embodiment of this invention.

PREFERRED EMBODIMENT

The fuel gas which is used to make the desired formate is a producer gas. It may be produced from coal or carbonaceous solid fuels derived from coal by reaction with steam and air in the conventional manner. Producer gas is primarily a mixture of carbon monoxide and nitrogen, containing small amounts of carbon dioxide and hydrogen with only traces of methane and oxygen. A typical producer gas made from coke may have 30 percent of carbon monoxide, 55 percent of nitrogen, 10 percent of hydrogen, and 4 percent of carbon dioxide. For the practice of the present invention, however, it is preferred to use a producer gas which is manufactured by use of air to which carbon dioxide is added as set forth below. This procedure increases the carbon monoxide content and reduces the hydrogen content of the gas. Since coal and solid fuels derived therefrom normally contain sulfur, the producer gases made therefrom generally contain $H_2S$ and hence this embodiment of my invention provides for such presence. Potassium is preferred over sodium for use as the alkali metal component of bicarbonate, carbonate and formate since the potassium salts are more soluble than the sodium salts in aqueous solution.

Referring to the drawing, producer gas is introduced into a Formate Synthesis Zone 10 by a conduit 12. An aqueous CO-absorbing solution which contains principally potassium bicarbonate, along with potassium carbonate and potassium formate is conducted by a conduit 14 into the Formate Synthesis Zone. Conditions are maintained in the Formate Synthesis Zone such that the carbon dioxide produced by the reaction of equations (1) and (2) is not absorbed but is allowed to escape with the effluent gas.

Within the Formate Synthesis Zone itself, the producer gas is maintained in intimate contact with the aqueous absorbing solution in a liquid state under conditions effective to separate the CO in the producer gas from nitrogen and any methane and hydrogen in the fuel gas. Carbon dioxide is partially removed as is most of the $H_2S$. That part of the $H_2S$ which is absorbed in the aqueous solution forms soluble sulfur-containing salts, for example, KHS. The desired contact between gas and solution may be in either a countercurrent or co-current manner but counter-current flow is preferred in two or more stages. A suitable design comprises a series of gas sparged trays with liquid flowing countercurrent to gas.

The temperature maintained in the Formate Synthesis Zone is preferably in the range of 425°–475° F., and the pressure is maintained preferably in the range of 50 to 100 atm. No catalyst is used.

Under the foregoing conditions maintained in the Formate Synthesis Zone, the carbon monoxide is absorbed by the potassium bicarbonate and potassium carbonate in the aqueous absorbing solution, in accordance with reactions (1) and (2). This absorption produces an aqueous solution which contains principally potassium formate with some unreacted carbonates, as well as soluble sulfur-containing potassium salts, for example KHS. Any nitrogen, methane, hydrogen, as well as other components of the fuel gas which are insoluble in aqueous alkali metal carbonate solution are discharged in the effluent gas from the Formate Synthesis Zone through conduit 16.

In the event the aqueous formate solution produced in the Formate Synthesis Zone contains an excessive amount of KHS, the solution may be subjected to stripping with steam at a temperature between 230° and 280° F. and a pressure between 5 and 20 psig, to thereby effect removal of $H_2S$ in accordance with the following reaction:

$$KHCO_3 + KHS = K_2CO_3 + H_2S \tag{4}$$

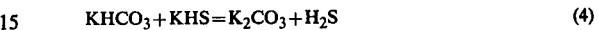

The effluent formate-containing aqueous solution produced in the Formate Synthesis Zone 10 is thereafter conducted by a conduit 18 to a Catalytic Formate Decomposition Zone 20. In this zone, the formate-containing aqueous solution is maintained in a liquid state in the presence of a catalyst at an elevated temperature and pressure. Extraneously generated steam is introduced into the zone through a conduit 22, and preferably is circulated through a trickle-phase fixed-bed catalytic system in countercurrent flow relationship to the downwardly moving aqueous formate solution. The use of extraneously generated steam assures the presence of sufficient water in the Decomposition Zone to maintain all salts in solution, thereby avoiding precipitation of salts on the catalyst composite and consequent deactivation. The preferred conditions maintained in this zone are a temperature in the range of 450°–525° F., and a pressure within the range of 50–125 atm.

The preferred catalysts used in the Formate Decomposition Zone are catalyst composites having a sulfided metallic component of Group VI supported on active carbon. $MoS_2$ and/or $WS_2$ are particularly preferred. Transition group metal sulfides, i.e. NiS, CoS, FeS, CuS, etc. may be added as promoters. The use of such catalysts in the Formate Decomposition Zone allows reaction (3) to proceed at a rapid rate at the relatively low temperature in the above-mentioned range, with little or no formation of either CO or oxalate, thus assuring maximum production and purity of the desired hydrogen.

The regenerated aqueous absorbing solution is removed from the Formate Decomposition Zone by a conduit 24. This solution contains principally potassium bicarbonate and carbonate, as well as undecomposed potassium formate. The amount of formate in the aqueous absorbing solution reaches an equilibrium value and does not affect the absorption of carbon monoxide in the Formate Synthesis Zone. The solution is cooled to a temperature between 300° and 400° F. by means of a suitable heat exchanger 26 positioned in conduit 24. The cooled solution is conducted to a hydrogen purification zone 30.

The hydrogen-rich effluent gas which contains a small amount of $CO_2$ is removed from the Formate Decomposition Zone by a conduit 32. This gas is conducted to the hydrogen purification zone 30, preferably packed with non-catalytic packing, where it is passed in countercurrent flow relationship to the down flowing cooled stream of regenerated solution. The hydrogen purification zone 30 is maintained at a temperature between 325° and 375° F. and a pressure between 50 and 125 atm. At the low temperature of the regenerated solution, $CO_2$ in the hydrogen-rich gas is reabsorbed. As a consequence, an effluent gas is recovered from the hydrogen purification zone 30 through a conduit 34 which consists essentially of hydrogen and water vapor. The latter is condensed by means of a heat exchanger 36 and recovered in a vessel 38 from which water is withdrawn through a conduit 40 and a gas consisting essentially of hydrogen is withdrawn through a conduit 42.

The regenerated solution is recycled to the Formate Synthesis Zone 10 after passing through a $KHCO_3$ decomposition zone 44 connected to the hydrogen purification zone 30 by a valved conduit 46. The purpose of this zone is to partially decompose bicarbonate to carbonate and at the same time to produce an air-$CO_2$ mixture for use in the gas producer (not shown) to thereby generate a CO-rich producer gas having a minimum $H_2$ content. Air is introduced into the $KHCO_3$ decomposition zone 44 through a conduit 48 and is used as a stripping gas to decompose the bicarbonate by the following reaction:

$$KHCO_3 = K_2CO_3 + CO_2 + H_2O \qquad (5)$$

at a temperature between 425° and 475° F. and a pressure between 50 and 100 atm. The effluent gas consisting essentially of $CO_2$, air and water vapor is removed by a conduit 49 through a condenser 50 to a collector 52 where the water and gas are separated, with the gas discharging through a conduit 54 and the water through a conduit 56. As previously stated, the gas containing air and $CO_2$ is recycled to the gas producer (not shown) for reaction with carbonaceous solids therein. The effluent regenerated solution with properly adjusted bicarbonate to carbonate ratio is withdrawn through conduit 14 for recycle to the Formate Synthesis Zone.

According to the provisions of the patent statutes, the principle, preferred construction and mode of operation of the invention have been explained, and what is considered to represent its best embodiment has been illustrated and described. However, it should be understood that, within the scope of the appended claims, the invention may be practiced otherwise than as specifically illustrated and described.

I claim:

1. In a process for the production of a hydrogen-rich gas from a fuel gas containing carbon monoxide and nitrogen or methane or both, the process consisting essentially of;
   (a) contacting said fuel gas with an aqueous absorbing solution which contains sodium or potassium bicarbonate and carbonate under formate synthesis conditions of a temperature in the range of 400°–600° F. and a pressure in the range of 20 to 150 atm., whereby an aqueous solution which contains principally formate is produced; and thereafter
   (b) heating the aqueous formate-containing solution produced in step (a) to decompose the formate to produce a hydrogen-rich gas and regenerate said aqueous absorbing solution, the improvement comprising;
heating said aqueous formate-containing solution in contact with a catalyst, said catalyst consisting essentially of at least one member selected from the group consisting of molybdenum and tungsten metals and their oxides and sulfides supported on an alkali resistant base.

2. The improvement of claim 1 wherein said base is selected from the group consisting of activated carbon, thoria, magnesia and pumice.

3. The improvement of claim 2 wherein said member is selected from the group consisting of $MoS_2$ and $WS_2$.

4. The improvement of claim 3 wherein said member is $MoS_2$ and wherein said base is activated carbon.

5. The improvement of claim 3 wherein said catalyst includes at least one promoter selected from the group consisting of Group VIII metals and their sulfides and oxides.

6. The improvement of claim 3 wherein said promoter is selected from the group consisting of NiS, COS, FeS and CuS.

* * * * *